(12) United States Patent
Sakagami

(10) Patent No.: US 10,365,539 B2
(45) Date of Patent: Jul. 30, 2019

(54) OPTICAL IMAGING SYSTEM

(71) Applicant: NALUX CO., LTD., Osaka-shi, Osaka (JP)

(72) Inventor: Norihisa Sakagami, Osaka (JP)

(73) Assignee: NALUX CO., LTD., Osaka-Shi, Osaka (JP)

(*) Notice: Subject to any disclaimer, the term of this patent is extended or adjusted under 35 U.S.C. 154(b) by 115 days.

(21) Appl. No.: 15/204,728

(22) Filed: Jul. 7, 2016

(65) Prior Publication Data

US 2016/0320688 A1    Nov. 3, 2016

Related U.S. Application Data

(63) Continuation-in-part of application No. PCT/JP2014/070859, filed on Aug. 7, 2014.

(30) Foreign Application Priority Data

Jul. 9, 2015 (JP) ................................. 2015-137655

(51) Int. Cl.
| | |
|---|---|
| G02B 13/22 | (2006.01) |
| G02B 13/04 | (2006.01) |
| G03B 11/00 | (2006.01) |

(52) U.S. Cl.
CPC .............. G03B 11/00 (2013.01); G02B 13/04 (2013.01); G02B 13/22 (2013.01)

(58) Field of Classification Search
CPC .. G02B 13/0035; G02B 5/20; G02B 27/0025; G02B 13/004; G02B 27/46; G02B 5/201;
(Continued)

(56) References Cited

U.S. PATENT DOCUMENTS

2008/0151393 A1* 6/2008 Tsuchimochi ......... G02B 13/04
359/784
2008/0180809 A1   7/2008 Igarashi
(Continued)

FOREIGN PATENT DOCUMENTS

| EP | 2 407 806 A1 | 1/2012 |
| JP | 10-227973 A | 8/1998 |

(Continued)

OTHER PUBLICATIONS

International Search Report & Written Opinion dated Oct. 21, 2014 corresponding to International Patent Application No. PCT/JP2014/070859.
Office Action dated Oct. 6, 2015 corresponding to Japanese Patent Application No. 2015-137655.

*Primary Examiner* — Thomas K Pham
*Assistant Examiner* — Sharrief I Broome
(74) *Attorney, Agent, or Firm* — Squire Patton Boggs (US) LLP

(57) ABSTRACT

An optical imaging system according to the present invention includes, in order from an object side to an image side, a first lens with negative refractive power, a second lens that is a meniscus lens having a convex image-side surface, an aperture stop, a third lens with positive refractive power, and a lens group with positive refractive power. When the center thickness of the first lens is represented as t1, the center thickness of the second lens is represented as t2 and the focal length of the whole system is represented as f, $t1/f > 1.2$ and $t2/f > 1.2$ are satisfied.

16 Claims, 10 Drawing Sheets

(58) Field of Classification Search
CPC .......... G02B 13/04; G02B 13/18; G02B 3/00;
G02B 5/205; G02B 9/12; G02B 9/34;
G02B 13/0085; G02B 15/173; G02B
15/177; G02B 1/043; G02B 23/243
See application file for complete search history.

(56) References Cited

U.S. PATENT DOCUMENTS

| | | | |
|---|---|---|---|
| 2011/0176049 A1 | 7/2011 | Hsieh et al. | |
| 2011/0249343 A1* | 10/2011 | Yanagisawa | G02B 13/04 359/650 |
| 2012/0016199 A1* | 1/2012 | Baba | A61B 1/00096 600/109 |
| 2012/0019904 A1 | 1/2012 | Inoue | |
| 2013/0107376 A1 | 5/2013 | Tsai et al. | |
| 2013/0258499 A1* | 10/2013 | Hashimoto | G02B 13/0045 359/714 |

FOREIGN PATENT DOCUMENTS

| | | |
|---|---|---|
| JP | 2002-303789 A | 10/2002 |
| JP | 2003-057539 A | 2/2003 |
| JP | 2006-243092 A | 9/2006 |
| JP | 2008-107391 A | 5/2008 |
| JP | 2008-158198 A | 7/2008 |
| JP | 2009-230042 A | 10/2009 |
| JP | 2010-139842 A | 6/2010 |
| WO | WO 2010/103595 A1 | 9/2010 |

* cited by examiner

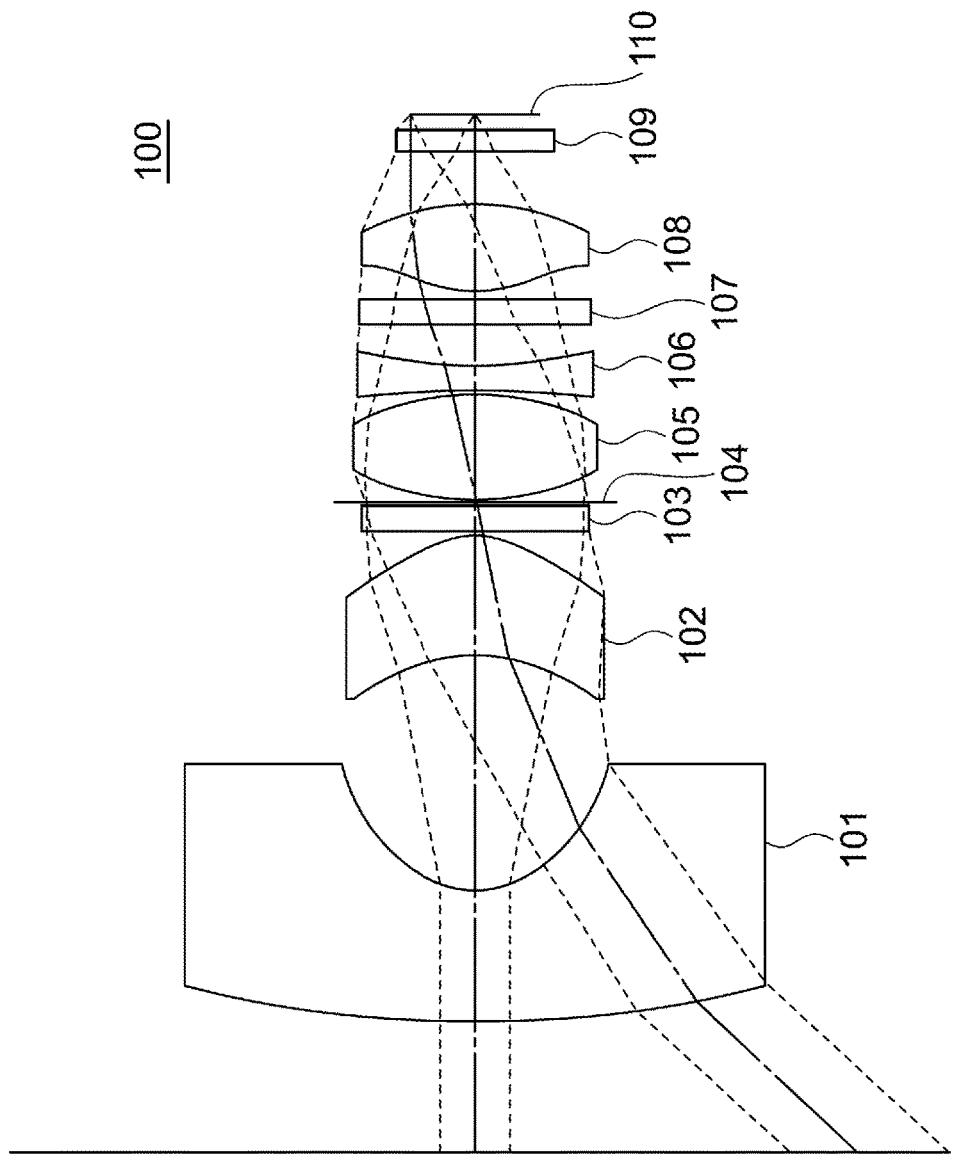

OPTICAL IMAGING SYSTEM

BACKGROUND

Field

The present invention relates to an optical imaging system.

Description of the Related Art

In an optical imaging system for detecting signal lights with a specific wavelength, a bandpass filter adapted to the specific wavelength is used. By means of the bandpass filter, noises can be removed without degradation of the signal lights.

Conventionally, in such an optical imaging system, the bandpass filter is located near the image surface because of facilitation of assembly or the like (for example, FIG. 1 of WO2010/103595A1).

On the other hand, in such an optical imaging system, when the F-number is reduced, the numerical aperture on the image side becomes greater. As a result, an angle of incidence onto a surface of the filter located near the image surface, of a marginal ray of a light beam which enters the optical imaging system and the principal ray of which is parallel to the optical axis becomes greater. Accordingly, the transmittance of the filter decreases, and that causes a problem that a sufficient amount of light does not reach a sensor located on the image surface even if the F-number is reduced in the optical imaging system.

Thus, an optical imaging system which is configured such that a sufficient amount of light reaches a sensor located on the image surface even when the optical imaging system has a reduced F-number and is provided with the filter has not been developed.

Accordingly, there is a need for an optical imaging system which is configured such that a sufficient amount of light reaches a sensor located on the image surface even when the optical imaging system has a reduced F-number and is provided with the filter.

SUMMARY

An optical imaging system according to the first aspect of the present invention includes, in order from an object side to an image side, a first lens with negative refractive power, a second lens that is a meniscus lens having a convex image-side surface, an aperture stop, a third lens with positive refractive power, and a lens group with positive refractive power. When the center thickness of the first lens is represented as $t1$, the center thickness of the second lens is represented as $t2$ and the focal length of the whole system is represented as $f$, $$t1/f > 1.2 \text{ and}$$

$$t2/f > 1.2$$

are satisfied.

In the optical imaging system according to the present aspect, by the use of the first lens with negative refractive power, the angle of incidence onto a surface of the aperture of the principal ray of a light beam entering the optical imaging system can be reduced. Further, by the use of the second lens that is a meniscus lens having a convex image-side surface and by the configuration in which when the center thickness of the second lens is represented as $t2$ and the focal length of the whole system is represented as $f$, $$t2/f > 1.2$$

is satisfied, angles of incidence onto a surface of the aperture of marginal rays of a light beam entering the optical imaging system can be reduced. Further, when a filter is located in a position adjacent to the aperture stop, angles of incidence onto a surface of the aperture of rays of the light beam can be reduced.

Further, by the configuration in which when the center thickness of the first lens is represented as $t1$, $$t1/f > 1.2$$

is satisfied, an influence of stray lights reflected on the image side of the first lens can be reduced.

In the optical imaging system according to the second aspect of the present invention includes, in order from an object side to an image side, a first lens with negative refractive power, a second lens that is a meniscus lens having a convex image-side surface, an aperture stop, a third lens with positive refractive power, and a lens group with positive refractive power. The lens group consists of a fourth lens with positive refractive power and when the center thickness of the second lens is represented as $t2$ and the focal length of the whole system is represented as $f$, $$t2/f > 1.2$$

is satisfied.

In the optical imaging system according to the present aspect, by the use of the first lens with negative refractive power, the angle of incidence onto a surface of the aperture of the principal ray of a light beam entering the optical imaging system can be reduced. Further, by the use of the second lens that is a meniscus lens having a convex image-side surface and by the configuration in which when the center thickness of the second lens is represented as $t2$ and the focal length of the whole system is represented as $f$, $$t2/f > 1.2$$

is satisfied, angles of incidence onto a surface of the aperture of marginal rays of a light beam entering the optical imaging system can be reduced. Further, when a filter is located in a position adjacent to the aperture stop, angles of incidence onto a surface of the aperture of rays of the light beam can be reduced.

Further, since four lenses alone are used as lenses, the optical imaging system is simplified.

In the optical imaging system according to the third aspect of the present invention includes, in order from an object side to an image side, a first lens with negative refractive power, a second lens that is a meniscus lens having a convex image-side surface, an aperture stop, a third lens with positive refractive power, and a lens group with positive refractive power. The lens group consists of a fourth lens with negative refractive power and a fifth lens with positive refractive power and when the center thickness of the second lens is represented as $t2$, the focal length of the fourth lens is $f4$ and the focal length of the whole system is represented as $f$, $$t2/f > 1.2 \text{ and}$$

$$f4/f < -4$$

are satisfied.

In the optical imaging system according to the present aspect, by the use of the first lens with negative refractive power, the angle of incidence onto a surface of the aperture of the principal ray of a light beam entering the optical imaging system can be reduced. Further, by the use of the second lens that is a meniscus lens having a convex image-side surface and by the configuration in which when the center thickness of the second lens is represented as t2 and the focal length of the whole system is represented as f, $$t2/f > 1.2$$

is satisfied, angles of incidence onto a surface of the aperture of marginal rays of a light beam entering the optical imaging system can be reduced. Further, when a filter is located in a position adjacent to the aperture stop, angles of incidence onto a surface of the aperture of rays of the light beam can be reduced.

Further, in the optical imaging system according to the present aspect, the focal length of the fourth lens is made relatively long, and thereby the spherical aberration can be reduced, and error sensitivity in manufacturing can be reduced, thus improving manufacturing yields and reducing costs.

In an optical imaging system according to an embodiment, a filter is provided immediately in front of or immediately behind the aperture stop.

In the present embodiment, the filter is adjacent to the aperture stop, and therefore angles of incidence onto a surface of the filter of rays of a light beam entering the optical imaging system can be reduced.

In an optical imaging system according to another embodiment, a filter is provided on the object side of the aperture stop.

Reflectance of a surface of the filter is higher than that of a surface of a lens. An influence of stray lights generated by reflection on a surface of the filter is advantageously reduced when the filter is provided on the object side of the aperture stop.

An optical imaging system according to another embodiment is configured such that angles of incidence onto the aperture surface of all rays of any light beam which enters the optical imaging system and the principal ray of which is at any angle with respect to the optical axis, from 0 to the half angle of view are 25 degrees or less.

In the present embodiment, when a filter is located in a position adjacent to the aperture stop, angles of incidence onto a surface of the filter of all rays of the light beam can be made 25 degrees or less.

An optical imaging system according to another embodiment is configured such that the F-number is 1.1 or less.

In an optical imaging system with the F-number of 1.1 or less, the numerical aperture is relatively great. In the present embodiment, angles of incidence onto a surface of the filter of rays of a light beam entering an optical imaging system with a relatively great numerical aperture can be reduced.

An optical imaging system according to another embodiment is configured such that the aperture radius is greater than the image height.

In the present embodiment, the aperture radius is greater than the image height, and therefore the angle of incidence onto the image surface of the principal ray can be reduced.

An optical imaging system according to another embodiment is configured such that the half angle of view is 45 degrees or more and 55 degrees or less.

In the present embodiment, angles of incidence onto a surface of the aperture of rays of a light beam entering an optical imaging system with a relatively great angle of view can be reduced.

In an optical imaging system according to another embodiment, the first lens has a convex object side surface.

In an optical imaging system according to another embodiment, the lens assembly consists of four lenses, and the third lens is an aspherical lens with positive refractive power.

In the present embodiment, the third lens is an aspherical lens with positive refractive power, and therefore the spherical aberration can be reduced.

In an optical imaging system according to another embodiment, the lens assembly consists of five lenses, and the third lens is a glass lens with positive refractive power.

In the present embodiment, the third lens is a glass lens with positive refractive power, and therefore a shift of the focal point due to a temperature change can be reduced.

In an optical imaging system according to another embodiment that has the features of the preceding embodiment, the third lens is a spherical lens.

In the present embodiment, the third lens is a spherical lens, and costs of the lens can be reduced.

In an optical imaging system according to another embodiment, the lens assembly consists of five lenses, and the fourth lens is an aspherical lens.

In the present embodiment, the fourth lens is an aspherical lens, and therefore the spherical aberration can be reduced.

BRIEF DESCRIPTION OF DRAWINGS

FIG. 1 shows an arrangement of an optical imaging system according to Example 1;

DETAILED DESCRIPTION

Figure 2A:
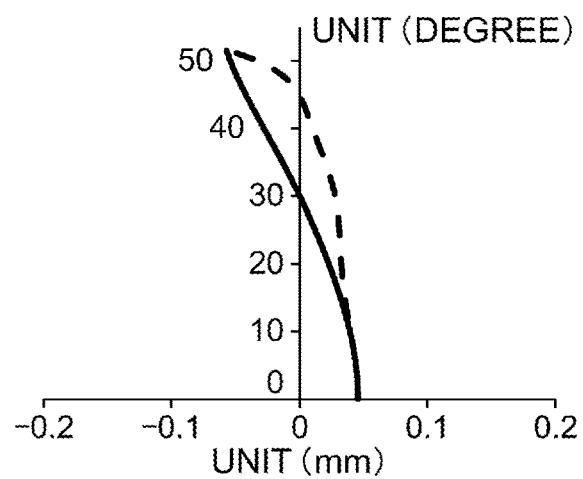
FIGS. 2A, 2B and 2C show aberrations of the optical imaging system of Example 1.

FIG. 1 shows an arrangement of an optical imaging system 100 according to an embodiment of the present invention. The embodiment corresponds to Example 1, which will be described later. The optical imaging system includes, from the object side to the image side, a first lens 101 with negative refractive power, a second lens 102 which is a meniscus lens having a convex image-side surface, a bandpass filter 103, an aperture stop 104, a third lens 105 with positive refractive power, a fourth lens 106 with negative refractive power, and a fifth lens 108 with positive refractive power. In the text of specification and claims, a lens with negative refractive power means a lens which has a negative refractive power for paraxial rays, and a lens with positive refractive power means a lens which has a positive refractive power for paraxial rays.

An optical imaging system according to an embodiment of the present invention is used with a projecting system including a light source emitting signal lights in a specific wavelength range, for example. By the use of a bandpass filter adapted to the specific wavelength range of the signal lights, background noises such as sunlight can be removed without degradation of the signal lights. The wavelength band of the bandpass filter is determined in consideration of the wavelength range of the signal lights. For example, the wavelength band of the bandpass filter of an optical imaging system for near-infrared cameras ranges from 800 nanometers to 900 nanometers.

In conventional optical imaging systems, the bandpass filter is located near the image surface because of facilitation of assembly or the like. On the other hand, in general, the numerical aperture of an optical imaging system having a F-number of 1.1 or less is relatively great. When the F-number is 0.9, as in the examples described later, the maximum angle of incidence of rays of light beams which enter the conventional optical imaging system onto a surface of the bandpass filter located near the image surface is 34 degrees or more. As a result, the transmittance of the bandpass filter decreases, and that causes a problem that a sensor located on the image surface is not supplied with a sufficient amount of light even if the optical imaging system is configured to have a reduced F-number.

In an optical imaging system according to an embodiment of the present invention, a first lens with negative refractive power, a second lens which is a meniscus lens having a convex image-side surface, a bandpass filter, an aperture stop, a third lens with positive refractive power, a fourth lens with negative refractive power, and a fifth lens with positive refractive power or a combination of a fourth lens and a fifth lens with positive refractive power are arranged in the above-described order from the object side to the image side. Further, when the center thickness of the second lens is represented as t2 and the focal length of the whole system is represented as f, the optical imaging system is configured such that the following expression is satisfied.

$$t2/f > 1.2$$

In the optical imaging system according to the embodiment of the present invention, the angle of incidence onto a surface of the aperture stop of the principal ray of a light beam entering the optical imaging system can be reduced by the use of the first lens with negative refractive power. Further, angles of incidence onto the surface of the aperture stop of marginal rays of a light beam entering the optical imaging system can be reduced by the use of the second lens which is a meniscus lens having a convex image-side surface and by the configuration in which the following expression holds $$t2/f > 1.2$$

when the center thickness of the second lens is represented as t2 and the focal length of the whole system is represented as f. Thus, in the optical imaging system according to the embodiment of the present invention, angles of incidence onto the surface of the aperture stop of rays of a light beam entering the optical imaging system can be reduced. Further, if a filter is located adjacent to the aperture stop, angles of incidence onto a surface of the filter of rays of the light beam can be reduced. Accordingly, the transmittance of the filter is improved, and therefore the sensor can be supplied with a sufficient amount of light.

Examples of the present invention will be described below.

In FIGS. 1, 3, 5, 7 and 9, the principal ray is represented as an alternate long and short dash line and marginal rays are represented by dashed lines.

The surfaces of each optical element of the optical imaging systems are defined by the following equations.

$$h = \sqrt{x^2 + y^2}$$

$$c = \frac{1}{R}$$

$$Z = \frac{ch^2}{1 + \sqrt{1 - (1+k)c^2h^2}} + \sum_{i=1}^{m} A_i h^i$$

The straight line connecting all the optical centers of the lenses in an optical imaging system is defined as the optical axis. x axis and y axis which are orthogonal to each other are defined in a plane which is perpendicular to the optical axis. Coordinate Z is defined along the optical axis, and the direction towards the image is defined as positive. "h" represents distance from the optical axis, "R" represents radius of curvature, and "c" represents curvature. "k" represents Conic constant, and "A" represents aspheric coefficients. "i and "m" represent integers.

Example 1

FIG. 1 shows an arrangement of an optical imaging system 100 according to Example 1. The optical imaging system 100 includes, from the object side to the image side, a first lens 101 with negative refractive power, a second lens 102 which is a meniscus lens having a convex image-side surface, a bandpass filter 103, an aperture stop 104, a third lens 105 with positive refractive power, a fourth lens 106 with negative refractive power, a wavelength filter 107, a fifth lens 108 with positive refractive power, and a cover glass 109. The image surface is marked with 110. In FIG. 1 and each of the following drawings showing an arrangement of an optical imaging system, a substantially parallel light beam which enters the optical imaging system and the principal ray of which is parallel to the optical axis and a substantially parallel light beam which enters the optical imaging system and the principal ray of which is at the half angle of view with respect to the optical axis are shown.

The material of the third lens 105 is glass, and the material of the other lenses is cyclo-olefin polymer (COP). The material of the bandpass filter 103 is glass, and the material of the wavelength filter 107 is polycarbonate. The aperture stop 104 is sheet shaped and has a circular opening and a light shielding portion around the opening. The aperture stop 104 is arranged in a plane which is perpendicular to the optical axis such that the center of the circular opening is aligned with the optical axis.

The wavelength band of the bandpass filter 103 ranges from 800 nanometers to 900 nanometers. The wavelength filter 107 serves as a complement to the bandpass filter 103, and prevents visible radiation lights from entering the sensor and from causing a problem even when the transmittance of visible radiation lights of the bandpass filter 103 increases to some extent.

The third lens 105 with positive refractive power, the fourth lens 106 with negative refractive power, and the fifth lens 108 with positive refractive power are configured such that the F-number is 1.1 or less.

Table 1 shows numerical values including those concerning the optical arrangement of the optical imaging system 100 of Example 1. "Surface number 1" represents the object side surface of the first lens 101, and "surface number 2" represents the image side surface of the first lens 101. The "distance between surfaces" corresponding to "surface number 1" represents the center thickness of the first lens 101, and the "distance between surfaces" corresponding to "surface number 2" represents the center-to-center spacing between the image side surface of the first lens 101 and the object side surface of the second lens 102 which is adjacent to the first lens 101. The "distance between surfaces" corresponding to "surface number 3" and the other surface numbers are defined in a similar way.

TABLE 1

| Surface number | Notes | Distance between surfaces (mm) | Refractive index | Abbe number | Surface type |
|---|---|---|---|---|---|
| 1 | First lens | 5 | 1.531 | 55.75 | Aspherical |
| 2 | First lens | 9.246 | — | — | Aspherical |
| 3 | Second lens | 4.5 | 1.531 | 55.75 | Aspherical |
| 4 | Second lens | 0.1 | — | — | Aspherical |
| 5 | Bandpass filter | 1 | 1.517 | 64.17 | Planar |
| 6 | Bandpass filter | 0.1 | — | — | Planar |
| 7 | Aperture stop | 0.1 | — | — | Planar |
| 8 | Third lens | 4.05 | 1.517 | 64.17 | Spherical |
| 9 | Third lens | 0.1 | — | — | Spherical |
| 10 | Fourth lens | 1 | 1.531 | 55.75 | Aspherical |
| 11 | Fourth lens | 1.587 | — | — | Aspherical |
| 12 | Wavelength filter | 1 | 1.582 | 30.02 | Planar |
| 13 | Wavelength filter | 0.3 | — | — | Planar |
| 14 | Fifth lens | 3.4 | 1.531 | 55.75 | Aspherical |
| 15 | Fifth lens | 2.116 | — | — | Aspherical |
| 16 | Cover glass | 0.7 | 1.517 | 64.17 | Planar |
| 17 | Cover glass | 0.7 | — | — | Planar |
| Image surface | — | 0 | — | — | Planar |

Table 2 shows constants and coefficients of the equations defining both surfaces of the first lens 101, the second lens 102, and the third lens 105.

TABLE 2

| | Surface No. 1 | Surface No. 2 | Surface No. 3 | Surface No. 4 | Surface No. 8 | Surface No. 9 |
|---|---|---|---|---|---|---|
| R | 124.053 | 4.041 | −8.241 | −5.035 | 11.55 | −11.55 |
| k | 0 | −0.555 | 0 | −0.318 | 0 | 0 |
| A4 | 1.560E−04 | 1.396E−05 | −6.624E−04 | 9.239E−04 | 0 | 0 |
| A6 | −1.553E−06 | 3.098E−05 | −3.339E−05 | 1.454E−05 | 0 | 0 |
| A8 | 7.267E−09 | −1.450E−06 | 3.721E−06 | −3.592E−07 | 0 | 0 |
| A10 | −1.314E−11 | 1.125E−08 | −5.545E−08 | 3.149E−08 | 0 | 0 |

Table 3 shows constants and coefficients of the equations defining both surfaces of the fourth lens 106 and the fifth lens 108.

TABLE 3

| | Surface No. 10 | Surface No. 11 | Surface No. 14 | Surface No. 15 |
|---|---|---|---|---|
| R | −17.503 | 13.965 | 5.249 | −9.063 |
| k | 0 | 0 | 0 | 0 |
| A4 | 1.669E−03 | −1.251E−03 | −2.961E−03 | 8.153E−04 |
| A6 | −3.620E−05 | 9.915E−05 | 2.714E−05 | −3.587E−05 |
| A8 | −3.450E−07 | −4.836E−06 | −2.073E−06 | 2.670E−07 |
| A10 | 1.180E−08 | 7.791E−08 | −1.851E−08 | −4.278E−09 |

Figure 2B:
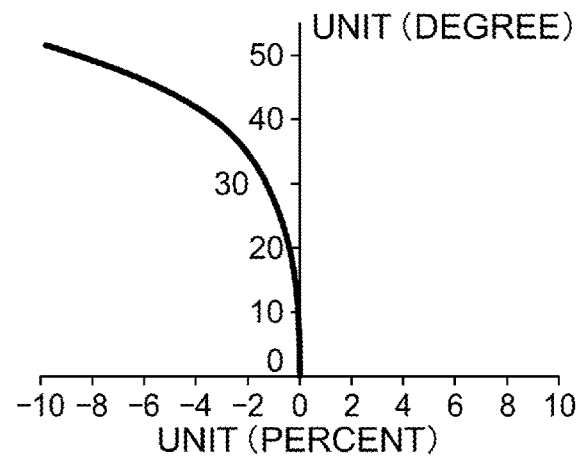
Figure 2C:
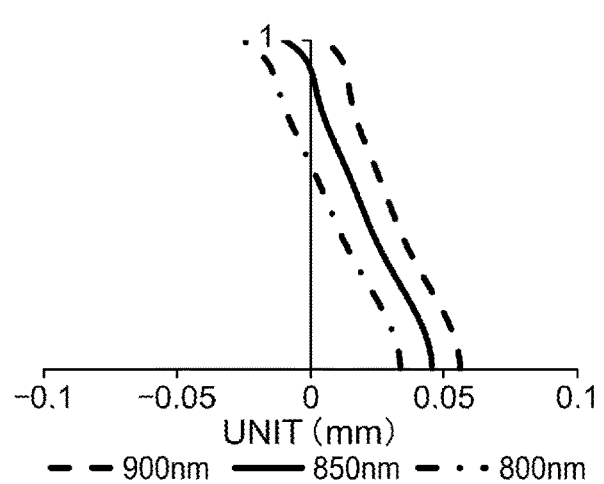

FIGS. 2A, 2B and 2C show aberrations of the optical imaging system 100 of Example 1. FIG. 2A shows astigmatism. The solid line of FIG. 2A shows the position of the tangential image surface formed by points of convergence of tangential marginal rays, and the dashed line of FIG. 2A shows the position of the sagittal image surface formed by points of convergence of sagittal marginal rays. The horizontal axis of FIG. 2A represents distance from the designed image surface. Positive values mean that a point of convergence of rays is on the opposite side of the designed image surface from the object, and negative values mean that a point of convergence of rays is on the same side of the designed image surface as the object. The unit of distance is millimeter. The vertical axis of FIG. 2A represents angle with respect to the optical axis of the principal ray of a light beam entering the optical imaging system 100. The angle ranges from 0 to the half angle of view. The unit of angle is degree. The wavelength of rays is 850 nanometers. FIG. 2B shows distortion. The horizontal axis of FIG. 2B represents ratio of distortion. The unit of ratio is percent. The vertical axis of FIG. 2B represents angle with respect to the optical axis of the principal ray of a light beam entering the optical imaging system 100. The angle ranges from 0 to the half angle of view. The unit of angle is degree. The wavelength of rays is 850 nanometers. FIG. 2C shows spherical aberrations of three rays having different wavelength values. The horizontal axis of FIG. 2C represents distance from the designed image surface. Positive values mean that a point of convergence of rays is on the opposite side of the designed image surface from the object, and negative values mean that a point of convergence of rays is on the same side of the designed image surface as the object. The unit of distance is millimeter. The vertical axis of FIG. 2C represents a relative value of distance between a ray that is parallel to the optical axis and the optical axis. The value of 1 shows that the distance from the optical axis is equal to the radius of the aperture.

Numerical values which represent main optical features of the optical imaging system 100 of Example 1 are shown below.

| | |
|---|---|
| Focal length of the whole system: | 2.64 mm |
| F-number: | 0.9 |
| Half angle of view: | 52 degrees |
| Angles of incidence onto a surface of the bandpass filter: | 22 degrees or less |
| Angles of incidence onto the imaging surface of the principal ray: | 3 degrees or less |

"Angles of incidence onto a surface of the bandpass filter" mean angles of incidence of all rays of any light beam which enters the optical imaging system and the principal ray of which is at any angle with respect to the optical axis, from 0 to the half angle of view. Further, "angles of incidence onto the imaging surface of the principal ray" mean angles of incidence of the principal ray which is at any angle with respect to the optical axis, from 0 to the half angle of view.

Example 2

Figure 3:
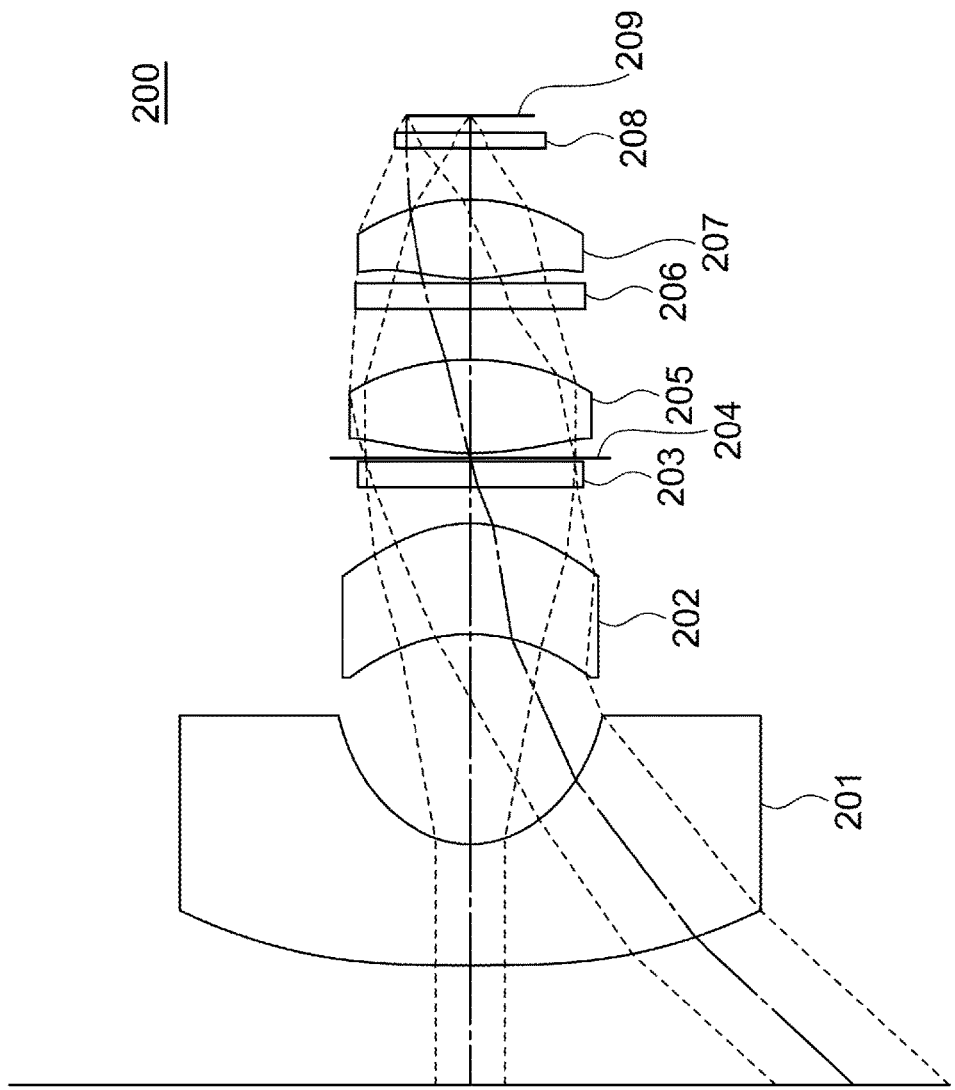
FIG. 3 shows an arrangement of an optical imaging system according to Example 2.

FIG. 3 shows an arrangement of an optical imaging system 200 according to Example 2. The optical imaging system 200 includes, from the object side to the image side, a first lens 201 with negative refractive power, a second lens 202 which is a meniscus having a convex image-side surface, a bandpass filter 203, an aperture stop 204, a third lens 205 with positive refractive power, a wavelength filter 206, a fourth lens 207 with positive refractive power, and a cover glass 208. The image surface is marked with 209.

The material of the third lens 205 is glass, and the material of the other lenses is cyclo-olefin polymer (COP). The material of the bandpass filter 203 is glass, and the material of the wavelength filter 206 is polycarbonate. The aperture stop 204 is sheet shaped and has a circular opening and a light shielding portion around the opening. The aperture stop 204 is arranged in a plane which is perpendicular to the optical axis such that the center of the circular opening is aligned with the optical axis.

The wavelength band of the bandpass filter 203 ranges from 800 nanometers to 900 nanometers. The wavelength filter serves 206 as a complement to the bandpass filter 203, and prevents visible radiation lights from entering the sensor and causing a problem even when the transmittance of visible radiation lights of the bandpass filter 203 increases to some extent.

The third lens 205 with positive refractive power and the fourth lens 207 with positive refractive power are configured such that the F-number is 1.1 or less.

Table 4 shows numerical values including those concerning the optical arrangement of the optical imaging system 200 of Example 2. "Surface number 1" represents the object side surface of the first lens 201, and "surface number 2" represents the image side surface of the first lens 201. The "distance between surfaces" corresponding to "surface number 1" represents the center thickness of the first lens 201, and the "distance between surfaces" corresponding to "surface number 2" represents the center-to-center spacing between the image side surface of the first lens 201 and the object side surface of the adjacent second lens 202. The "distance between surfaces" corresponding to "surface number 3" and the other surface numbers are defined in a similar way.

TABLE 4

| Surface number | Notes | Distance between surfaces (mm) | Refractive index | Abbe number | Surface type |
|---|---|---|---|---|---|
| 1 | First lens | 5 | 1.531 | 55.75 | Aspherical |
| 2 | First lens | 8.649 | — | — | Aspherical |
| 3 | Second lens | 4.5 | 1.531 | 55.75 | Aspherical |
| 4 | Second lens | 1.563 | — | — | Aspherical |
| 5 | Bandpass filter | 1 | 1.517 | 64.17 | Planar |
| 6 | Bandpass filter | 0.1 | — | — | Planar |
| 7 | Aperture stop | 0.232 | — | — | Planar |
| 8 | Third lens | 3.8 | 1.531 | 55.75 | Aspherical |
| 9 | Third lens | 2.073 | — | — | Aspherical |
| 10 | Wavelength filter | 1 | 1.582 | 30.02 | Planar |
| 11 | Wavelength filter | 0.3 | | | Planar |
| 12 | Fourth lens | 3.17 | 1.531 | 55.75 | Aspherical |
| 13 | Fourth lens | 2.1 | — | — | Aspherical |
| 14 | Cover glass | 0.7 | 1.517 | 64.17 | Planar |
| 15 | Cover glass | 0.7 | — | — | Planar |
| Image surface | — | 0 | — | — | Planar |

Table 5 shows constants and coefficients of the equations defining both surfaces of the first lens 201, the second lens 202, and the third lens 205.

TABLE 5

| | Surface No. 1 | Surface No. 2 | Surface No. 3 | Surface No. 4 | Surface No. 8 | Surface No. 9 |
|---|---|---|---|---|---|---|
| R | 75 | 3.973 | −9.667 | −6.294 | 16.41 | −10.354 |
| k | 0 | −0.555 | 0 | −0.318 | 0 | 0 |
| A4 | 1.658E−04 | 1.926E−04 | −9.598E−04 | 3.793E−05 | −2.956E−04 | −3.688E−04 |
| A6 | −1.465E−06 | 2.934E−05 | −5.697E−05 | 1.785E−05 | 6.341E−05 | 3.662E−06 |
| A8 | 7.398E−09 | −2.058E−06 | 3.671E−06 | −5.222E−07 | −7.873E−08 | 4.090E−07 |
| A10 | −1.350E−11 | 3.383E−08 | −4.612E−08 | 2.010E−08 | −1.048E−08 | −1.683E−08 |

Table 6 shows constants and coefficients of the equations defining both surfaces of the fourth lens 207.

TABLE 6

| | Surface No. 12 | Surface No. 13 |
|---|---|---|
| R | 10.754 | −7.458 |
| k | 0 | 0 |
| A4 | −2.088E−03 | 6.287E−04 |
| A6 | 4.369E−05 | −2.996E−05 |
| A8 | −2.973E−06 | 4.904E−07 |
| A10 | 7.063E−08 | 8.596E−09 |

Figure 4A:
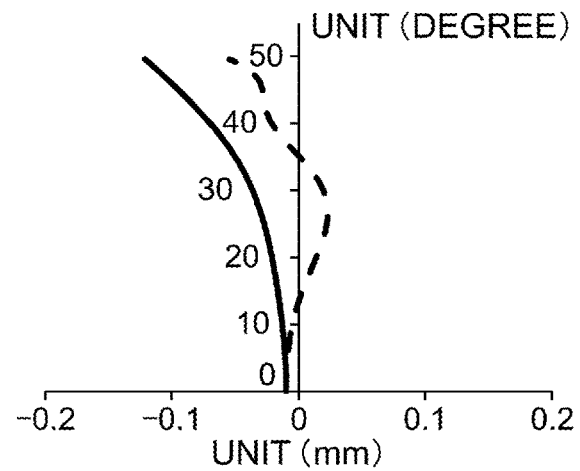
FIGS. 4A, 4B and 4C show aberrations of the optical imaging system of Example 2.
Figure 4B:
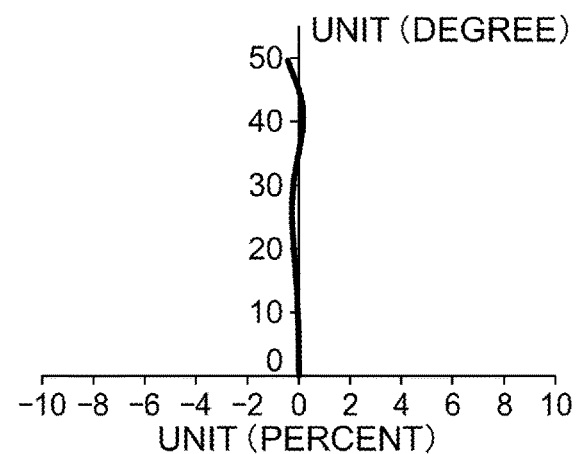
Figure 4C:
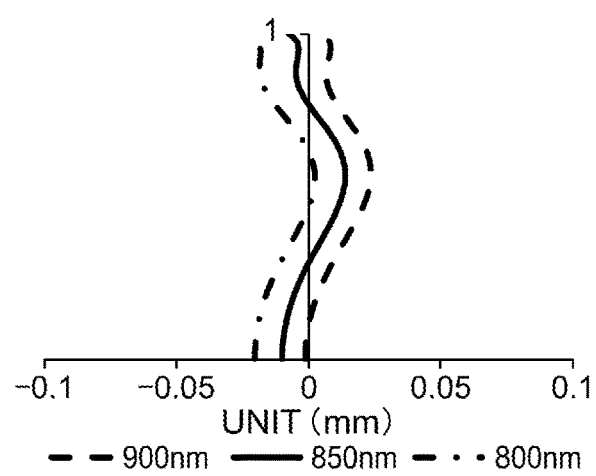

FIGS. 4A, 4B and 4C show aberrations of the optical imaging system 200 of Example 2. FIG. 4A shows astigmatism. The solid line of FIG. 4A shows the position of the tangential image surface formed by points of convergence of tangential marginal rays, and the dashed line of FIG. 4A shows the position of the sagittal image surface formed by points of convergence of sagittal marginal rays. The horizontal axis of FIG. 4A represents distance from the designed image surface. Positive values mean that a point of convergence of rays is on the opposite side of the designed image surface from the object, and negative values mean that a point of convergence of rays is on the same side of the designed image surface as the object. The unit of distance is millimeter. The vertical axis of FIG. 4A represents angle with respect to the optical axis of the principal ray of a light beam entering the optical imaging system 200. The angle ranges from 0 to the half angle of view. The unit of angle is degree. The wavelength of rays is 850 nanometers. FIG. 4B shows distortion. The horizontal axis of FIG. 4B represents ratio of distortion. The unit of ratio is percent. The vertical axis of FIG. 4B represents angle with respect to the optical axis of the principal ray of a light beam entering the optical imaging system 100. The angle ranges from 0 to the half angle of view. The unit of angle is degree. The wavelength of rays is 850 nanometers. FIG. 4C shows spherical aberrations of three rays having different wavelength values. The horizontal axis of FIG. 4C represents distance from the designed image surface. Positive values mean that a point of convergence of rays is on the opposite side of the designed image surface from the object, and negative values mean that a point of convergence of rays is on the same side of the designed image surface as the object. The unit of distance is millimeter. The vertical axis of FIG. 4C represents relative value of distance between a ray that is parallel to the optical axis and the optical axis. The value of 1 shows that the distance from the optical axis is equal to the radius of the aperture.

Numerical values which represent main optical features of the optical imaging system 200 of Example 2 are shown below.

| | |
|---|---|
| Focal length of the whole system: | 2.56 mm |
| F-number: | 0.9 |
| Half angle of view: | 50 degrees |
| Angles of incidence onto a surface of the bandpass filter: | 22 degrees or less |
| Angles of incidence onto the imaging surface of the principal ray: | 5 degrees or less |

"Angles of incidence onto a surface of the bandpass filter" mean angles of incidence of all rays of any light beam which enters the optical imaging system and the principal ray of which is at any angle with respect to the optical axis, from 0 to the half angle of view. Further, "angles of incidence onto the imaging surface of the principal ray" mean angles of incidence of the principal ray which is at any angle with respect to the optical axis, from 0 to the half angle of view.

Example 3

Figure 5:
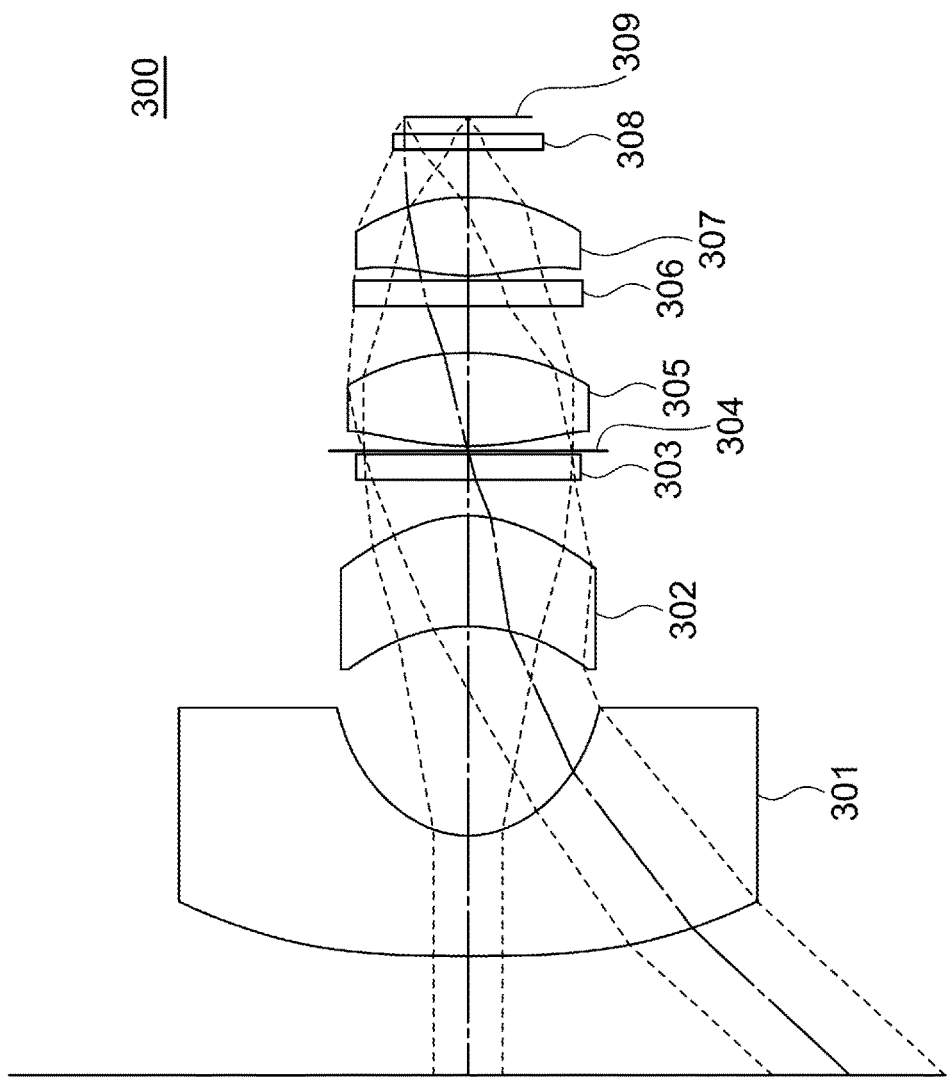
FIG. 5 shows an arrangement of an optical imaging system according to Example 3.

FIG. 5 shows an arrangement of an optical imaging system 300 according to Example 3. The optical imaging system 300 includes, from the object side to the image side, a first lens 301 with negative refractive power, a second lens 302 which is a meniscus lens having a convex image-side surface, a bandpass filter 303, an aperture stop 304, a third lens 305 with positive refractive power, a wavelength filter 306, a fourth lens 307 with positive refractive power, and a cover glass 308. The image surface is marked with 309.

The material of the third lens 305 is glass, and the material of the other lenses is cyclo-olefin polymer (COP). The material of the bandpass filter 303 is glass, and the material of the wavelength filter 306 is polycarbonate. The aperture stop 304 is sheet shaped and has a circular opening and a light shielding portion around the opening. The aperture stop 304 is arranged in a plane which is perpendicular to the optical axis such that the center of the circular opening is aligned with the optical axis.

The wavelength band of the bandpass filter 303 ranges from 800 nanometers to 900 nanometers. The wavelength filter serves 306 as a complement to the bandpass filter 303, and prevents visible radiation lights from entering the sensor and causing a problem even when the transmittance of visible radiation lights of the bandpass filter 303 increases to some extent.

The third lens 305 with positive refractive power and the fourth lens 307 with positive refractive power are configured such that the F-number is 1.1 or less.

Table 7 shows numerical values including those concerning the optical arrangement of the optical imaging system 300 of Example 3. "Surface number 1" represents the object side surface of the first lens 301, and "surface number 2" represents the image side surface of the first lens 301. The "distance between surfaces" corresponding to "surface number 1" represents the center thickness of the first lens 301, and the "distance between surfaces" corresponding to "surface number 2" represents the center-to-center spacing between the image side surface of the first lens 301 and the object side surface of the adjacent second lens 302. The "distance between surfaces" corresponding to "surface number 3" and the other surface numbers are defined in a similar way.

TABLE 7

| Surface number | Notes | Distance between surfaces (mm) | Refractive index | Abbe number | Surface type |
|---|---|---|---|---|---|
| 1 | First lens | 5 | 1.531 | 55.75 | Aspherical |
| 2 | First lens | 8.68 | — | — | Aspherical |
| 3 | Second lens | 4.5 | 1.531 | 55.75 | Aspherical |
| 4 | Second lens | 1.609 | — | — | Aspherical |
| 5 | Bandpass filter | 1 | 1.517 | 64.17 | Planar |
| 6 | Bandpass filter | 0.1 | — | — | Planar |
| 7 | Aperture stop | 0.221 | — | — | Planar |
| 8 | Third lens | 3.8 | 1.517 | 64.17 | Aspherical |
| 9 | Third lens | 2.05 | — | — | Aspherical |
| 10 | Wavelength filter | 1 | 1.582 | 30.02 | Planar |
| 11 | Wavelength filter | 0.3 | | | Planar |
| 12 | Fourth lens | 3.17 | 1.531 | 55.75 | Aspherical |
| 13 | Fourth lens | 2.1 | — | — | Aspherical |
| 14 | Cover glass | 0.7 | 1.517 | 64.17 | Planar |
| 15 | Cover glass | 0.7 | — | — | Planar |
| Image surface | — | 0 | — | — | Planar |

Table 8 shows constants and coefficients of the equations defining both surfaces of the first lens 301, the second lens 302, and the third lens 305.

TABLE 8

| | Surface No. 1 | Surface No. 2 | Surface No. 3 | Surface No. 4 | Surface No. 8 | Surface No. 9 |
|---|---|---|---|---|---|---|
| R | 75 | 3.984 | −9.717 | −6.319 | 15.602 | −10.164 |
| k | 0 | −0.555 | 0 | −0.318 | 0 | 0 |

TABLE 8-continued

|     | Surface No. 1 | Surface No. 2 | Surface No. 3 | Surface No. 4 | Surface No. 8 | Surface No. 9 |
|-----|---------------|---------------|---------------|---------------|---------------|---------------|
| A4  | 1.643E−04     | 1.892E−04     | −9.522E−04    | 4.932E−05     | −3.037E−04    | −3.619E−04    |
| A6  | −1.465E−06    | 2.929E−05     | −5.692E−05    | 1.745E−05     | 6.650E−06     | 4.023E−06     |
| A8  | 7.402E−09     | −2.072E−06    | 3.672E−06     | −5.266E−07    | −7.882E−08    | 4.282E−07     |
| A10 | −1.347E−11    | 3.299E−08     | −4.611E−08    | 2.026E−08     | −1.052E−08    | −1.760E−08    |

Table 9 shows constants and coefficients of the equations defining both surfaces of the fourth lens 307.

TABLE 9

|     | Surface No. 12 | Surface No. 13 |
|-----|----------------|----------------|
| R   | 10.728         | −7.444         |
| k   | 0              | 0              |
| A4  | −2.100E−03     | 6.328E−04      |
| A6  | 4.448E−05      | −3.002E−05     |
| A8  | −2.968E−06     | 4.946E−07      |
| A10 | 6.978E−08      | 8.545E−09      |

Figure 6A:
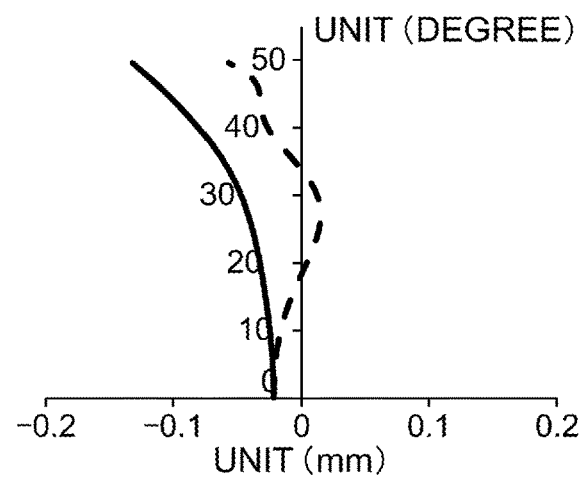
FIGS. 6A, 6B and 6C show aberrations of the optical imaging system of Example 3.
Figure 6B:
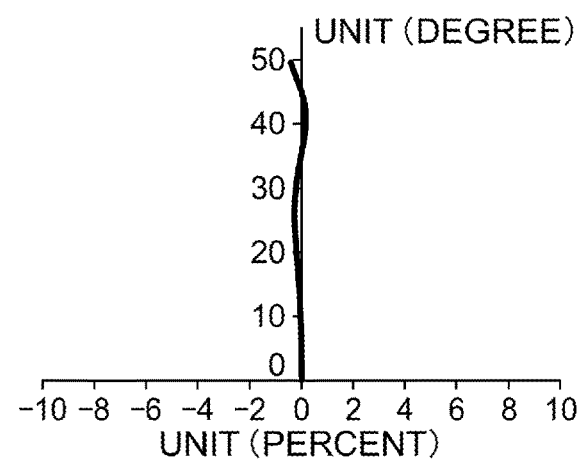
Figure 6C:
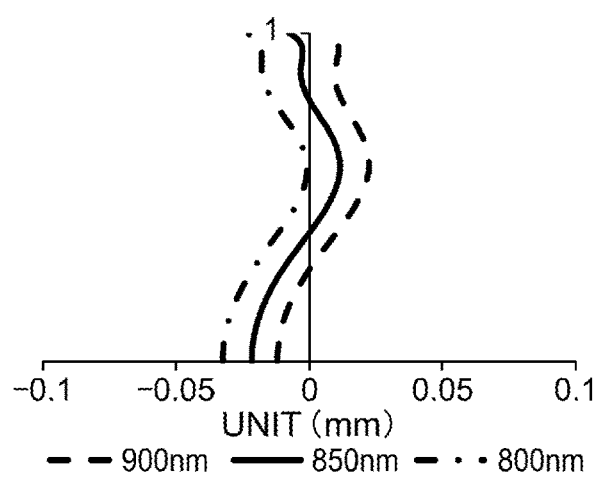

FIGS. 6A, 6B and 6C show aberrations of the optical imaging system 300 of Example 3. FIG. 6A shows astigmatism. The solid line of FIG. 6A shows the position of the tangential image surface formed by points of convergence of tangential marginal rays, and the dashed line of FIG. 6A shows the position of the sagittal image surface formed by points of convergence of sagittal marginal rays. The horizontal axis of FIG. 6A represents distance from the designed image surface. Positive values mean that a point of convergence of rays is on the opposite side of the designed image surface from the object, and negative values mean that a point of convergence of rays is on the same side of the designed image surface as the object. The unit of distance is millimeter. The vertical axis of FIG. 6A represents angle with respect to the optical axis of the principal ray of a light beam entering the optical imaging system 200. The angle ranges from 0 to the half angle of view. The unit of angle is degree. The wavelength of rays is 850 nanometers. FIG. 6B shows distortion. The horizontal axis of FIG. 6B represents ratio of distortion. The unit of ratio is percent. The vertical axis of FIG. 6B represents angle with respect to the optical axis of the principal ray of a light beam entering the optical imaging system 100. The angle ranges from 0 to the half angle of view. The unit of angle is degree. The wavelength of rays is 850 nanometers. FIG. 6C shows spherical aberrations of three rays having different wavelength values. The horizontal axis of FIG. 6C represents distance from the designed image surface. Positive values mean that a point of convergence of rays is on the opposite side of the designed image surface from the object, and negative values mean that a point of convergence of rays is on the same side of the designed image surface as the object. The unit of distance is millimeter. The vertical axis of FIG. 6C represents relative value of distance between a ray that is parallel to the optical axis and the optical axis. The value of 1 shows that the distance from the optical axis is equal to the radius of the aperture.

Numerical values which represent main optical features of the optical imaging system 300 of Example 3 are shown below.

| Focal length of the whole system: | 2.56 mm |
|---|---|
| F-number: | 0.9 |
| Half angle of view: | 50 degrees |
| Angles of incidence onto a surface of the bandpass filter: | 22 degrees or less |
| Angles of incidence onto the imaging surface of the principal ray: | 5 degrees or less |

"Angles of incidence onto a surface of the bandpass filter" mean angles of incidence of all rays of any light beam which enters the optical imaging system and the principal ray of which is at any angle with respect to the optical axis, from 0 to the half angle of view. Further, "angles of incidence onto the imaging surface of the principal ray" mean angles of incidence of the principal ray which is at any angle with respect to the optical axis, from 0 to the half angle of view.

Example 4

Figure 7:
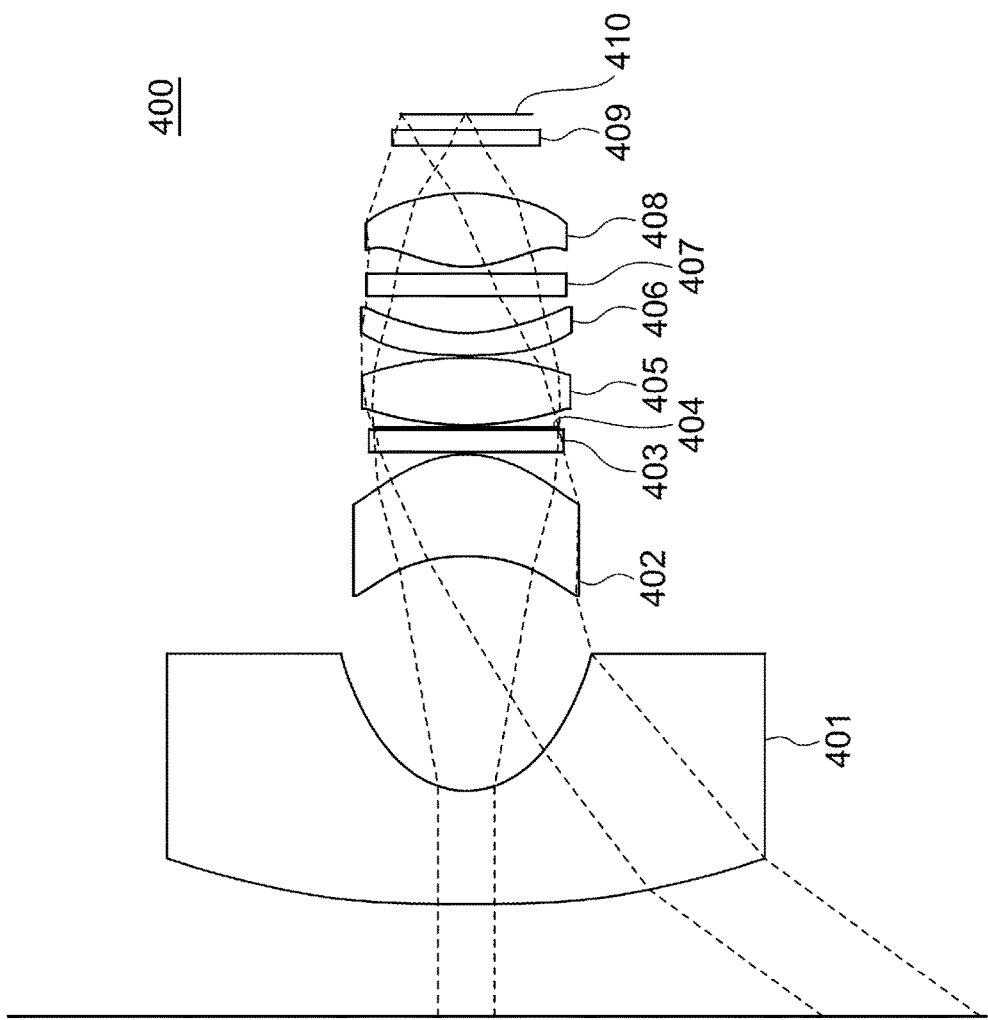
FIG. 7 shows an arrangement of an optical imaging system according to Example 4.

FIG. 7 shows an arrangement of an optical imaging system 400 according to Example 1. The optical imaging system 400 includes, from the object side to the image side, a first lens 401 with negative refractive power, a second lens 402 which is a meniscus lens having a convex image-side surface, a bandpass filter 403, an aperture stop 404, a third lens 405 with positive refractive power, a fourth lens 406 with negative refractive power, a wavelength filter 407, a fifth lens 408 with positive refractive power, and a cover glass 409. The image surface is marked with 410.

The material of the third lens 405 is glass, and the material of the other lenses is cyclo-olefin polymer (COP). The material of the bandpass filter 403 is glass, and the material of the wavelength filter 407 is polycarbonate. The aperture stop 404 is sheet shaped and has a circular opening and a light shielding portion around the opening. The aperture stop 404 is arranged in a plane which is perpendicular to the optical axis such that the center of the circular opening is aligned with the optical axis.

The wavelength band of the bandpass filter 403 ranges from 800 nanometers to 900 nanometers. The wavelength filter 407 serves as a complement to the bandpass filter 403, and prevents visible radiation lights from entering the sensor and causing a problem even when the transmittance of visible radiation lights of the bandpass filter 403 increases to some extent.

The third lens 405 with positive refractive power, the fourth lens 406 with negative refractive power, and the fifth lens 408 with positive refractive power are configured such that the F-number is 1.1 or less.

Table 10 shows numerical values including those concerning the optical arrangement of the optical imaging system 400 of Example 4. "Surface number 1" represents the object side surface of the first lens 401, and "surface number 2" represents the image side surface of the first lens 401. The "distance between surfaces" corresponding to "surface number 1" represents the center thickness of the first lens 401, and the "distance between surfaces" corresponding to "surface number 2" represents the center-to-center spacing between the image side surface of the first lens 401 and the object side surface of the adjacent second lens 402. The "distance between surfaces" corresponding to "surface number 3" and the other surface numbers are defined in a similar way.

TABLE 10

| Surface number | Notes | Distance between surfaces (mm) | Refractive index | Abbe number | Surface type |
|---|---|---|---|---|---|
| 1 | First lens | 5 | 1.531 | 55.75 | Aspherical |
| 2 | First lens | 10.414 | — | — | Aspherical |
| 3 | Second lens | 4.5 | 1.531 | 55.75 | Aspherical |
| 4 | Second lens | 0.1 | — | — | Aspherical |
| 5 | Bandpass filter | 1 | 1.517 | 64.17 | Planar |
| 6 | Bandpass filter | 0.1 | — | — | Planar |
| 7 | Aperture stop | 0.1 | — | — | Planar |
| 8 | Third lens | 3 | 1.517 | 64.17 | Spherical |
| 9 | Third lens | 0.1 | — | — | Spherical |
| 10 | Fourth lens | 1 | 1.531 | 55.75 | Aspherical |
| 11 | Fourth lens | 1.636 | — | — | Aspherical |
| 12 | Wavelength filter | 1 | 1.582 | 30.02 | Planar |
| 13 | Wavelength filter | 0.3 | — | — | Planar |
| 14 | Fifth lens | 3.25 | 1.531 | 55.75 | Aspherical |
| 15 | Fifth lens | 2.1 | — | — | Aspherical |
| 16 | Cover glass | 0.7 | 1.517 | 64.17 | Planar |
| 17 | Cover glass | 0.7 | — | — | Planar |
| Image surface | — | 0 | — | — | Planar |

Table 11 shows constants and coefficients of the equations defining both surfaces of the first lens 401, the second lens 402, and the third lens 405.

TABLE 11

|   | Surface No. 1 | Surface No. 2 | Surface No. 3 | Surface No. 4 | Surface No. 8 | Surface No. 9 |
|---|---|---|---|---|---|---|
| R | 279.001 | 4.016 | −8.981 | −5.009 | 15 | −15 |
| k | 0 | −0.555 | 0 | −0.318 | 0 | 0 |
| A4 | 1.962E−04 | −4.443E−05 | −8.101E−04 | 1.329E−03 | 0 | 0 |
| A6 | −1.812E−06 | 4.508E−05 | −3.250E−05 | −3.949E−06 | 0 | 0 |
| A8 | 7.841E−09 | −1.751E−06 | 3.052E−06 | 1.751E−07 | 0 | 0 |
| A10 | −1.277E−11 | 7.251E−09 | −4.023E−08 | 2.278E−08 | 0 | 0 |

Table 12 shows constants and coefficients of the equations defining both surfaces of the fourth lens 406 and the fifth lens 408.

TABLE 12

|   | Surface No. 10 | Surface No. 11 | Surface No. 14 | Surface No. 15 |
|---|---|---|---|---|
| R | 20.381 | 6.981 | 5.531 | −8.880 |
| k | 0 | 0 | 0 | 0 |
| A4 | 5.905E−04 | −2.686E−03 | −2.598E−03 | 1.286E−03 |
| A6 | 1.462E−05 | 1.010E−04 | −1.987E−05 | −9.970E−05 |
| A8 | −1.796E−07 | −1.748E−06 | −1.126E−06 | 2.489E−06 |
| A10 | 0 | 0 | −4.852E−08 | −4.334E−08 |

Figure 8A:
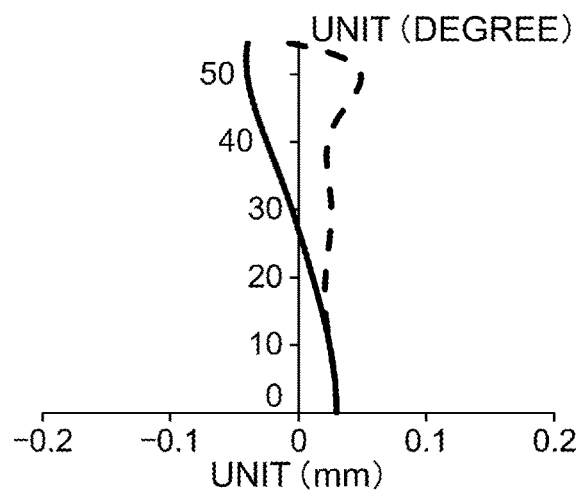
FIGS. 8A, 8B and 8C show aberrations of the optical imaging system of Example 4.
Figure 8B:
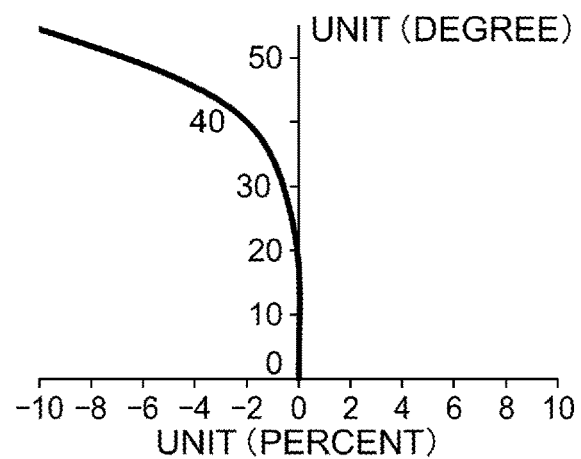
Figure 8C:
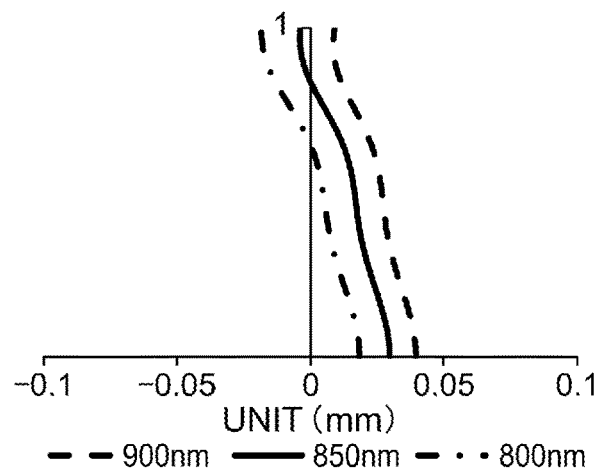

FIGS. 8A, 8B and 8C show aberrations of the optical imaging system 400 of Example 4. FIG. 8A shows astigmatism. The solid line of FIG. 8A shows the position of the tangential image surface formed by points of convergence of tangential marginal rays, and the dashed line of FIG. 8A shows the position of the sagittal image surface formed by points of convergence of sagittal marginal rays. The horizontal axis of FIG. 8A represents distance from the designed image surface. Positive values mean that a point of convergence of rays is on the opposite side of the designed image surface from the object, and negative values mean that a point of convergence of rays is on the same side of the designed image surface as the object. The unit of distance is millimeter. The vertical axis of FIG. 8A represents angle with respect to the optical axis of the principal ray of a light beam entering the optical imaging system 400. The angle ranges from 0 to the half angle of view. The unit of angle is degree. The wavelength of rays is 850 nanometers. FIG. 8B shows distortion. The horizontal axis of FIG. 8B represents ratio of distortion. The unit of ratio is percent. The vertical axis of FIG. 8B represents angle with respect to the optical axis of the principal ray of a light beam entering the optical imaging system 400. The angle ranges from 0 to the half angle of view. The unit of angle is degree. The wavelength of rays is 850 nanometers. FIG. 8C shows spherical aberrations of three rays having different wavelength values. The horizontal axis of FIG. 8C represents distance from the designed image surface. Positive values mean that a point of convergence of rays is on the opposite side of the designed image surface from the object, and negative values mean that a point of convergence of rays is on the same side of the designed image surface as the object. The unit of distance is millimeter. The vertical axis of FIG. 8C represents relative value of distance between a ray that is parallel to the optical axis and the optical axis. The value of 1 shows that the distance from the optical axis is equal to the radius of the aperture.

Numerical values which represent main optical features of the optical imaging system 500 of Example 5 are shown below.

| | |
|---|---|
| Focal length of the whole system: | 2.37 mm |
| F-number: | 0.9 |
| Half angle of view: | 55 degrees |
| Angles of incidence onto a surface of the bandpass filter: | 22 degrees or less |
| Angles of incidence onto the imaging surface of the principal ray: | 3 degrees or less |

"Angles of incidence onto a surface of the bandpass filter" mean angles of incidence of all rays of any light beam which enters the optical imaging system and the principal ray of which is at any angle with respect to the optical axis, from 0 to the half angle of view. Further, "angles of incidence onto the imaging surface of the principal ray" mean angles of incidence of the principal ray which is at any angle with respect to the optical axis, from 0 to the half angle of view.

Example 5

Figure 9:
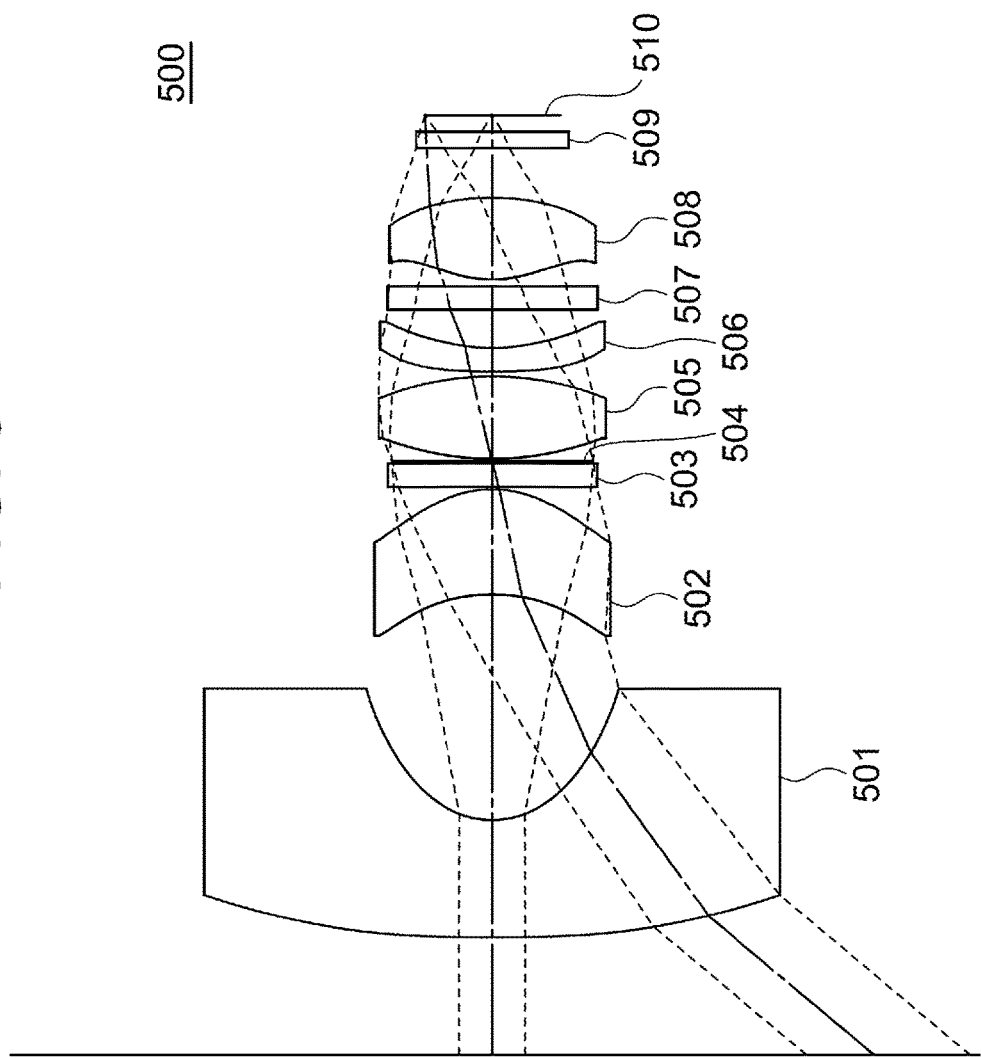
FIG. 9 shows an arrangement of an optical imaging system according to Example 5.

FIG. 9 shows an arrangement of an optical imaging system 500 according to Example 1. The optical imaging system 500 includes, from the object side to the image side, a first lens 501 with negative refractive power, a second lens 502 which is a meniscus lens having a convex image-side surface, a bandpass filter 503, an aperture stop 504, a third lens 505 with positive refractive power, a fourth lens 506 with negative refractive power, a wavelength filter 507, a fifth lens 508 with positive refractive power, and a cover glass 509. The image surface is marked with 510.

The material of the third lens 505 is glass, and the material of the other lenses is cyclo-olefin polymer (COP). The material of the bandpass filter 503 is glass, and the material of the wavelength filter 507 is polycarbonate. The aperture stop 504 is sheet shaped and has a circular opening and a light shielding portion around the opening. The aperture stop 504 is arranged in a plane which is perpendicular to the optical axis such that the center of the circular opening is aligned with the optical axis.

The wavelength band of the bandpass filter 503 ranges from 800 nanometers to 1000 nanometers. The wavelength filter 507 serves as a complement to the bandpass filter 503, and prevents visible radiation lights from entering the sensor and causing a problem even when the transmittance of visible radiation lights of the bandpass filter 503 increases to some extent.

The third lens 505 with positive refractive power, the fourth lens 506 with negative refractive power, and the fifth lens 508 with positive refractive power are configured such that the F-number is 1.1 or less.

Table 13 shows numerical values including those concerning the optical arrangement of the optical imaging system 500 of Example 5. "Surface number 1" represents the object side surface of the first lens 501, and "surface number 2" represents the image side surface of the first lens 501. The "distance between surfaces" corresponding to "surface number 1" represents the center thickness of the first lens 501, and the "distance between surfaces" corresponding to "surface number 2" represents the center-to-center spacing between the image side surface of the first lens 501 and the object side surface of the adjacent second lens 502. The "distance between surfaces" corresponding to "surface number 3" and the other surface numbers are defined in a similar way.

TABLE 13

| Surface number | Notes | Distance between surfaces (mm) | Refractive index | Abbe number | Surface type |
|---|---|---|---|---|---|
| 1 | First lens | 5 | 1.531 | 55.75 | Aspherical |
| 2 | First lens | 9.58 | — | — | Aspherical |
| 3 | Second lens | 4.5 | 1.531 | 55.75 | Aspherical |
| 4 | Second lens | 0.1 | — | — | Aspherical |
| 5 | Bandpass filter | 1 | 1.517 | 64.17 | Planar |
| 6 | Bandpass filter | 0.1 | — | — | Planar |
| 7 | Aperture stop | 0.1 | — | — | Planar |
| 8 | Third lens | 3.5 | 1.517 | 64.17 | Spherical |
| 9 | Third lens | 0.2 | — | — | Spherical |
| 10 | Fourth lens | 1 | 1.531 | 55.75 | Aspherical |
| 11 | Fourth lens | 1.62 | — | — | Aspherical |
| 12 | Wavelength filter | 1 | 1.582 | 30.02 | Planar |
| 13 | Wavelength filter | 0.3 | | | Planar |
| 14 | Fifth lens | 3.5 | 1.531 | 55.75 | Aspherical |
| 15 | Fifth lens | 2.1 | — | — | Aspherical |
| 16 | Cover glass | 0.7 | 1.517 | 64.17 | Planar |
| 17 | Cover glass | 0.7 | — | — | Planar |
| Image surface | — | 0 | — | — | Planar |

Table 14 shows constants and coefficients of the equations defining both surfaces of the first lens 501, the second lens 502, and the third lens 505.

TABLE 14

| | Surface No. 1 | Surface No. 2 | Surface No. 3 | Surface No. 4 | Surface No. 8 | Surface No. 9 |
|---|---|---|---|---|---|---|
| R | 128.509 | 4.040 | −8.833 | −5.098 | 14 | −14 |
| k | 0 | −0.555 | 0 | −0.318 | 0 | 0 |
| A4 | 1.531E−04 | 1.104E−05 | −7.614E−04 | 1.135E−03 | 0 | 0 |
| A6 | −1.493E−06 | 3.390E−05 | −2.416E−05 | 2.559E−06 | 0 | 0 |
| A8 | 7.102E−09 | −1.552E−06 | 2.672E−06 | 5.423E−08 | 0 | 0 |
| A10 | −1.270E−11 | 1.236E−08 | −3.857E−08 | 2.020E−08 | 0 | 0 |

Table 15 shows constants and coefficients of the equations defining both surfaces of the fourth lens 506 and the fifth lens 508.

TABLE 15

| | Surface No. 10 | Surface No. 11 | Surface No. 14 | Surface No. 15 |
|---|---|---|---|---|
| R | 37.709 | 8.002 | 5.485 | −10.229 |
| k | 0 | 0 | 0 | 0 |
| A4 | 9.460E−04 | −2.157E−03 | −2.801E−03 | 7.005E−04 |
| A6 | 6.833E−06 | 9.610E−05 | −2.081E−05 | −7.597E−05 |
| A8 | −1.408E−07 | −1.684E−06 | −9.140E−07 | 1.915E−06 |
| A10 | 0 | 0 | −4.149E−08 | −2.747E−08 |

Figure 10A:
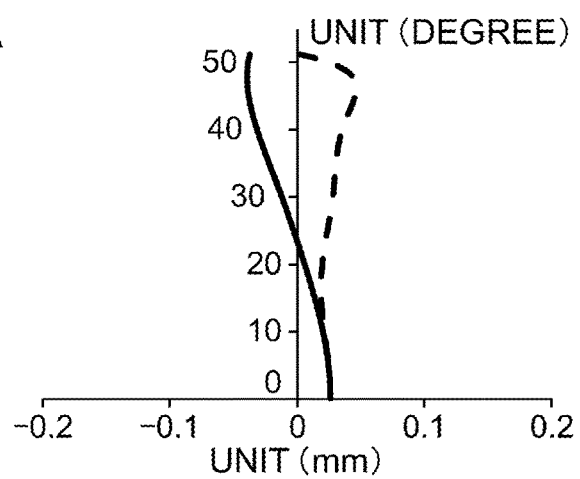
FIGS. 10A, 10B and 10C show aberrations of the optical imaging system of Example 5.
Figure 10B:
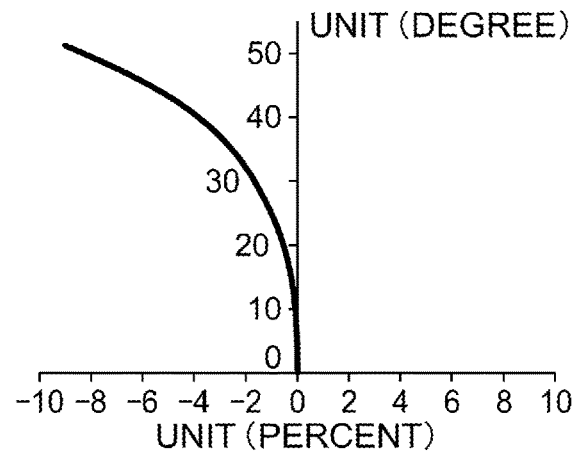
Figure 10C:
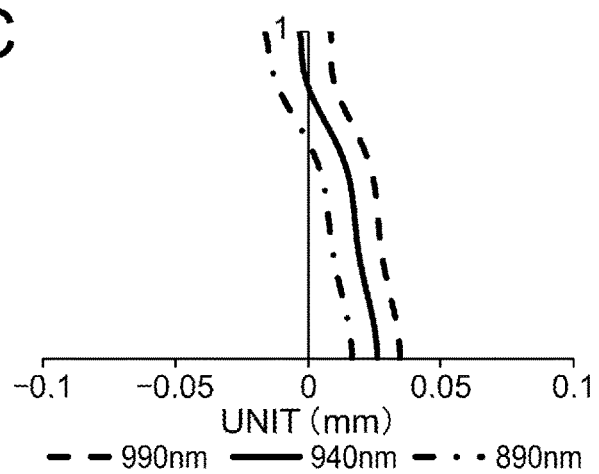

FIGS. 10A, 10B and 10C show aberrations of the optical imaging system 500 of Example 5. FIG. 10A shows astigmatism. The solid line of FIG. 10A shows the position of the tangential image surface formed by points of convergence of tangential marginal rays, and the dashed line of FIG. 10A shows the position of the sagittal image surface formed by points of convergence of sagittal marginal rays. The horizontal axis of FIG. 10A represents distance from the designed image surface. Positive values mean that a point of convergence of rays is on the opposite side of the designed image surface from the object, and negative values mean that a point of convergence of rays is on the same side of the designed image surface as the object. The unit of distance is millimeter. The vertical axis of FIG. 10A represents angle with respect to the optical axis of the principal ray of a light beam entering the optical imaging system 400. The angle ranges from 0 to the half angle of view. The unit of angle is degree. The wavelength of rays is 940 nanometers. FIG. 10B shows distortion. The horizontal axis of FIG. 10B represents ratio of distortion. The unit of ratio is percent. The vertical axis of FIG. 10B represents angle with respect to the optical axis of the principal ray of a light beam entering the optical imaging system 400. The angle ranges from 0 to the half angle of view. The unit of angle is degree. The wavelength of rays is 940 nanometers. FIG. 10C shows spherical aberrations of three rays having different wavelength values. The horizontal axis of FIG. 10C represents distance from the designed image surface. Positive values mean that a point of convergence of rays is on the opposite side of the designed image surface from the object, and negative values mean that a point of convergence of rays is on the same side of the designed image surface as the object. The unit of distance is millimeter. The vertical axis of FIG. 10C represents relative value of distance between a ray that is parallel to the optical axis and the optical axis. The value of 1 shows that the distance from the optical axis is equal to the radius of the aperture.

Numerical values which represent main optical features of the optical imaging system 500 of Example 5 are shown below.

| | |
|---|---|
| Focal length of the whole system: | 2.65 mm |
| F-number: | 0.9 |
| Half angle of view: | 51 degrees |
| Angles of incidence onto a surface of the bandpass filter: | 22 degrees or less |
| Angles of incidence onto the imaging surface of the principal ray: | 3 degrees or less |

"Angles of incidence onto a surface of the bandpass filter" mean angles of incidence onto a surface of the bandpass filter of all rays of any light beam which enters the optical imaging system and the principal ray of which is at any angle with respect to the optical axis, from 0 to the half angle of view. Further, "angles of incidence onto the imaging surface of the principal ray" mean angles of incidence of the principal ray which is at any angle with respect to the optical axis, from 0 to the half angle of view.

Table 16 shows focal length of the whole optical imaging system and respective lenses of Examples 1 to 5. The unit of focal length is millimeter.

TABLE 16

| Focal length | Example 1 | Example 2 | Example 3 | Example 4 | Example 5 |
|---|---|---|---|---|---|
| Whole system | 2.64 | 2.56 | 2.56 | 2.37 | 2.65 |
| First lens | −8.09 | −8.20 | −8.23 | −7.82 | −8.09 |
| Second lens | 16.65 | 23.59 | 23.68 | 15.55 | 16.31 |
| Third lens | 12.04 | 12.73 | 12.70 | 15.23 | 14.38 |
| Fourth lens | −14.66 | 8.94 | 8.92 | −20.79 | −19.65 |

TABLE 16-continued

| Focal length | Example 1 | Example 2 | Example 3 | Example 4 | Example 5 |
|---|---|---|---|---|---|
| Fifth lens | 7.05 | — | — | 7.05 | 7.40 |
| Synthetic focal length ($4^{th}$ & $5^{th}$) | 9.11 | — | — | 8.70 | 9.37 |

In Examples 2 and 3, the focal length of the fourth is positive, and the fourth lens has positive refractive power. In Examples 1, 4 and 5, the synthetic focal length of the fourth and fifth lenses is positive. That is, the lens group consisting of the fourth and fifth lenses has a positive refractive power.

Table 17 shows relationships between central thickness of lenses and focal length.

TABLE 17

| | f4/f | t1/f | t2/f |
|---|---|---|---|
| Example 1 | −5.6 | 1.9 | 1.7 |
| Example 2 | — | 2.0 | 1.8 |
| Example 3 | — | 2.0 | 1.8 |
| Example 4 | −8.8 | 2.1 | 1.9 |
| Example 5 | −7.4 | 1.9 | 1.7 |

"f" represents focal length of the whole system, and "f4" represents focal length of the fourth lens. "t1" and "t2" represent values of center thickness of the first lens and the second lens, respectively. In Examples 1 to 5, the following expressions are satisfied.

$$t1/f > 1.2$$

$$t2/f > 1.2$$

In Examples 1, 4 and 5, the following expression is satisfied.

$$f4/f < -4$$

Table 18 shows numerical values which represent main optical features of the optical imaging systems of Examples 1 to 5. The unit of length in Table 18 is millimeter.

TABLE 18

| | Example 1 | Example 2 | Example 3 | Example 4 | Example 5 |
|---|---|---|---|---|---|
| F-number | 0.9 | 0.9 | 0.9 | 0.9 | 0.9 |
| Half angle of view | 52 degrees | 50 degrees | 50 degrees | 55 degrees | 51 degrees |
| Maximum value of angle of incidence onto aperture surface | 22 degrees | 22 degrees | 22 degrees | 22 degrees | 22 degrees |
| Maximum value of angle of incidence onto bandpass filter surface | 22 degrees | 22 degrees | 22 degrees | 22 degrees | 22 degrees |
| Maximum value of angle of incidence onto image surface of principal ray | 3 degrees | 5 degrees | 5 degrees | 3 degrees | 3 degrees |
| Aperture radius | 4.384 | 4.260 | 4.264 | 4.243 | 4.469 |
| Image height | 2.995 | 2.995 | 2.995 | 2.995 | 2.995 |

"Aperture radius" means radius of the circle of the aperture of the aperture stop. "Image height" means distance on the image surface between the point of convergence of the light beam the principal ray of which enters the system at the half angle of view with respect to the optical axis and the optical axis.

As shown in Table 18, in the optical imaging system of Examples 1 to 5, the maximum value of angles of incidence onto the aperture surface of all rays of any light beam which enters the optical imaging system and the principal ray of which is at any angle with respect to the optical axis, from 0 to the half angle of view is 22 degrees. Since the bandpass filter is adjacent to the aperture stop, the maximum value of angles of incidence onto a surface of the bandpass filter of all rays of the above-described light beam is also approximately 22 degrees. As shown in Table 18, in the optical imaging system of Examples 1 to 5, the aperture radius is greater than the image height. When the aperture radius is made greater than the image height, the angle of incidence onto the image surface of the principal ray can be reduced. As shown in Table 18, in the optical imaging system of Examples 1 to 5, the half angle of view ranges from 50 degrees to 55 degrees. In conventional optical imaging systems, the maximum value of angles of incidence onto a surface of the bandpass filter of rays is approximately 24 degrees when the F-number is 1.2, for example. However, the maximum value is 34 degrees or more when the F-number is 0.9 like in Examples 1 to 5. Thus, in conventional optical imaging systems, when the F-number is reduced (the system is made brighter), angles of incidence onto a surface of the bandpass filter of rays remarkably increase, and therefore the transmittance of the bandpass filter remarkably decreases so that an amount of light reaching the sensor is remarkably reduced. However, in an optical imaging system according to the present invention, angles of incidence onto a surface of the bandpass filter of rays do not remarkably increase, and the transmittance of the bandpass filter does not remarkably decrease. Accordingly, in an optical imaging system according to the present invention, a remarkable reduction of an amount of light reaching the sensor due to the bandpass filter can be prevented even when the F-number is 0.9.

What is claimed is:

1. An optical imaging system comprising, in order from an object side to an image side, a first lens with negative refractive power, a second lens that is a meniscus lens having a convex image-side surface, an aperture stop, a third lens with positive refractive power, and a lens group with positive refractive power, wherein when the center thickness of the first lens is represented as t1, the center thickness of the second lens is represented as t2, and the focal length of the whole system is represented as f, $$t1/f > 1.2 \text{ and}$$

$$t2/f > 1.2$$

are satisfied, and
wherein the optical imaging system is configured with an F-number of 1.1 or less.

2. The optical imaging system according to claim 1, further comprising a filter immediately in front of or immediately behind the aperture stop.

3. The optical imaging system according to claim 1, configured such that angles of incidence onto the aperture surface of all rays of any light beam which enters the optical imaging system and the principal ray of which is at any angle with respect to the optical axis, from 0 to the half angle of view are 25 degrees or less.

4. The optical imaging system according to claim 1, configured such that the aperture radius is greater than the image height.

5. The optical imaging system according to claim 1, configured such that the half angle of view is 45 degrees or more and 55 degrees or less.

6. An optical imaging system comprising, in order from an object side to an image side, a first lens with negative refractive power, a second lens that is a meniscus lens having a convex image-side surface, an aperture stop, a third lens with positive refractive power, and a fourth lens with positive refractive power, wherein when the center thickness of the first lens is represented as t1, the center thickness of the second lens is represented as t2, and the focal length of the whole system is represented as f, $$t1/f > 1.2 \text{ and}$$

$$t2/f > 1.2$$

are satisfied, and
wherein the optical imaging system is configured with an F-number of 1.1 or less.

7. The optical imaging system according to claim 6, further comprising a filter immediately in front of or immediately behind the aperture stop.

8. The optical imaging system according to claim 6, configured such that angles of incidence onto the aperture surface of all rays of any light beam which enters the optical imaging system and the principal ray of which is at any angle with respect to the optical axis, from 0 to the half angle of view are 25 degrees or less.

9. The optical imaging system according to claim 6, configured such that the aperture radius is greater than the image height.

10. The optical imaging system according to claim 6, configured such that the half angle of view is 45 degrees or more and 55 degrees or less.

11. An optical imaging system comprising, in order from an object side to an image side, a first lens with negative refractive power, a second lens that is a meniscus lens having a convex image-side surface, an aperture stop, a third lens with positive refractive power, a fourth lens with negative refractive power, and a fifth lens with positive refractive power, wherein when the center thickness of the first lens is represented as t1, the center thickness of the second lens is represented as t2, and the focal length of the whole system is represented as f, $$t1/f > 1.2 \text{ and}$$

$$t2/f > 1.2$$

are satisfied, and
wherein the optical imaging system is configured with an F-number of 1.1 or less.

12. The optical imaging system according to claim 11, further comprising a filter immediately in front of or immediately behind the aperture stop.

13. The optical imaging system according to claim 11, configured such that angles of incidence onto the aperture surface of all rays of any light beam which enters the optical imaging system and the principal ray of which is at any angle with respect to the optical axis, from 0 to the half angle of view are 25 degrees or less.

14. The optical imaging system according to claim 11, configured such that the aperture radius is greater than the image height.

15. The optical imaging system according to claim 11, configured such that the half angle of view is 45 degrees or more and 55 degrees or less.

16. The optical imaging system according to claim 11, wherein when the focal length of the fourth lens is represented as f4, $$f4/f < -4$$

is satisfied.

* * * * *